(12) United States Patent
Kershaw

(10) Patent No.: US 7,650,479 B2
(45) Date of Patent: Jan. 19, 2010

(54) MAINTAINING CACHE COHERENCY FOR SECURE AND NON-SECURE DATA ACCESS REQUESTS

(75) Inventor: Daniel Kershaw, Cambridge (GB)

(73) Assignee: ARM Limited, Cambridge (GB)

( * ) Notice: Subject to any disclaimer, the term of this patent is extended or adjusted under 35 U.S.C. 154(b) by 292 days.

(21) Appl. No.: 11/523,808

(22) Filed: Sep. 20, 2006

(65) Prior Publication Data
US 2008/0072004 A1 Mar. 20, 2008

(51) Int. Cl.
*G06F 13/26* (2006.01)
(52) U.S. Cl. .................... 711/163; 711/156; 711/167
(58) Field of Classification Search ................. 711/163, 711/167, 156
See application file for complete search history.

(56) References Cited

U.S. PATENT DOCUMENTS 6,282,657 B1  8/2001 Kaplan et al.
6,292,874 B1  9/2001 Barnett
2002/0007456 A1  1/2002 Peinado et al.
2005/0198442 A1 * 9/2005 Mandler .................. 711/145

* cited by examiner

*Primary Examiner*—Sanjiv Shah
*Assistant Examiner*—Jae U Yu
(74) *Attorney, Agent, or Firm*—Nixon & Vanderhye P.C.

(57) ABSTRACT

A cache in a data processing apparatus has a status field associated with each entry in the cache to store a security value indicative of whether the data stored in that entry are secure data, non-secure data or aliased data. Secure data are only accessible in response to a secure data access request, non-secure data are only accessible in response to a non-secure data access request and aliased data are accessible in response to either a secure or a non-secure data access request. The data processing apparatus also has bus fabric which provides security data in response to a bus access request, the security data being indicative of whether the bus access request is to a storage location designated as secure, non-secure or aliased.

13 Claims, 8 Drawing Sheets

| CACHE ENTRY SECURITY STATUS | ACCESS SECURITY | ADDRESS MATCH | HIT? |
| --- | --- | --- | --- |
| ALIASED | - | MATCH | YES |
| NS | NS | MATCH | YES |
| S | S | MATCH | YES |
| NS | S | MATCH | NO |
| S | NS | MATCH | NO |
| - | - | NO MATCH | NO |

MAINTAINING CACHE COHERENCY FOR SECURE AND NON-SECURE DATA ACCESS REQUESTS

TECHNICAL FIELD

The field of the invention relates to data processing and in particular to the management of data caches in which both secure and non-secure data are stored.

BACKGROUND

A data processing apparatus is commonly provided with a data cache in which copies of a subset of data items present in an external memory may be stored, such that these copies may be accessed by the processor unit faster than if the original data items were accessed in the external memory. For data items which are needed frequently by the processor, the provision of this data cache can result in significant time saving for the data processing apparatus.

A known data processing apparatus is illustrated in FIG. 1 and the steps of the operation of its cache are shown in FIG. 2. FIG. 1 schematically illustrates a data processing apparatus 10 including a processor 20, a cache 30, a bus 40, an external memory device 50 and a peripheral device 60. The processor 20 performs calculations and manipulations on data items stored in the memory 50, however rather than reading a data item from the memory 50 and re-writing it there every time a calculation is performed on that particular data item, a cache 30 is provided to store temporary copies of data items that the processor needs. Being located in close proximity to the processor 20, access times to the cache 30 are significantly shorter than via the bus 40 to the external memory 50. When the processor 20 issues a memory access request it is first checked whether a copy of the required data item is currently stored in the cache 30. If such a copy exists in the cache 30, this is known as a cache "hit" and the copy of the data item may be read or altered by the processor memory access request much faster than if that data item were stored in the external memory 50. However, the access time advantages gained by the provision of a cache 30 must be balanced against other considerations, in particular the size of the cache 30.

Being physically located close to the processor 20, indeed they are commonly both accommodated on the same chip, the space available for the cache 30 is rather limited. Furthermore there is a known trade-off between cache size and cache speed—smaller caches tend to operate faster. Consequently the cache 30 will typically only store a small subset of the data items stored in the external memory 50. When a copy of a new data item is stored in the cache 30 therefore, a copy of a data item already stored in the cache 30 must be selected to be overwritten. Several algorithms for selecting this "victim" are known in the art and will not be discussed further here. An entry in the cache 30 which is selected to be overwritten or "victimised" must be examined before being overwritten to establish whether the data item has been altered since being copied from the external memory 50. This is typically kept track of by a means of a status bit associated with the entry in the cache called a "dirty" bit, "dirty" indicating that the data item has changed since being copied. If this is the case then the victim must be "evicted", that is, passed to the external memory 50 to update the original data item therein.

The steps involved in the functionality of the cache 30 described above are illustrated in FIG. 2. It should be noted that in a typical data processor not all memory mappings are cacheable, e.g. some peripheral addresses are not, however for the remainder of this description it is assumed that the exemplary memory addresses are indeed cacheable. Firstly at step 100 the processor issues a memory access request. It is then checked, at step 110, whether a copy of the requested data item is stored in the cache, i.e. whether or not there is a "cache hit". This is typically performed by comparing the address of the memory access request with the data addresses (or portions thereof called TAGs) associated with the entries in the cache. If there is a cache hit then the memory access request may complete in the cache (step 120). If the memory access request is a write operation then the cache line containing this data item is marked as "dirty", since the data item has now been altered since being copied from the external memory 50. If the memory access request misses in the cache then the flow proceeds to step 130, where a cache line is selected to be victimized, i.e. overwritten. The selected line is then examined at step 140 to see if it is dirty. If it is then the copy of this data item must be returned to the external memory 50 to update the original therein and at step 150 this victim is evicted. Thereafter the flow proceeds to step 160 (or directly from step 140 if the victim line was not dirty) and a bus access request is issued to the external memory 50 to retrieve the data item requested by the memory access request from the processor at step 100.

In addition there arise many instances where the data items used by at least one of the applications running on the processor are sensitive data items that should not be accessible by other applications that can be run on the processor. An example would be where the data processing apparatus is a smart card, and one of the applications is a security application which uses sensitive data, such as for example secure keys, to perform validation, authentication, decryption and the like. It is clearly important in such situations to ensure that such sensitive data are kept secure so that they cannot be accessed by other applications that may be loaded onto the data processing apparatus, for example hacking applications that have been loaded onto the data processing apparatus with the purpose of seeking to access those secure data.

In known systems, it has typically been the job of the operating system developer to ensure that the operating system provides sufficient security to ensure that the secure data of one application cannot be accessed by other applications running under the control of the operating system. However, as systems become more complex, the general trend is for operating systems to become larger and more complex, and in such situations it becomes increasingly difficult to ensure sufficient security within the operating system itself Examples of systems seeking to provide secure storage of sensitive data and to provide protection against malicious program code are those described in U. S. patent application Ser. No. 2002/0007456 A1 and U.S. Pat. No. 6,282,657 B and U.S. Pat. No. 6,292,874 B. In such systems the data processing apparatus is provided with separate domains, these domains providing a mechanism for handling security at the hardware level, by having a secure domain and a non-secure domain. The non-secure and secure domains in effect establish separate worlds, with the secure domain providing a trusted execution space separated by hardware enforced boundaries from other execution spaces, and likewise the non-secure domain providing a non-trusted execution space. A program executing in a specified non-secure domain does not have access to data identified as secure. Each access request then has a domain security signal associated therewith identifying whether the access is a secure access or a non-secure access.

However whilst some data must be kept secure as described above, there may also be other data items which may need to be accessed by both secure and non-secure applications. One example of this would be when a secure and a non-secure application need to exchange information. Accordingly, it will be desirable to provide an improved technique, which enables a data cache to manage the correct security level of, and access to, the copies of data items it stores.

In systems having multiple bus masters additional problems of coherency arise. All bus masters in a multi-master system, particularly CPUs in a multi-processing system, need a consistent, up to-date view of all memory resources they share. Hence it follows those systems in which one or more caches are capable of making local copies of shared memory resources must provide at least one mechanism to ensure a consistent, up to date view of shared memory resources is still provided to all the bus masters sharing those resources. The property of maintaining consistency between one or more cached copies of shared memory resources between multiple bus masters is referred to as cache coherency.

Software components executing in secure and non-secure domains are often required to communicate via a shared memory mechanism. The maximum security classification which can be afforded to such shared memory, which can be manipulated by non-secure bus masters, is non-secure. As such, data shared between secure and non-secure domains is usually established in the memory map of the non-secure domain, and so may always be accessed by a non-secure bus master.

In known systems, if such shared data is cached, and is required to be accessed by at least one bus master which is only able to issue secure access requests, cache coherency must be managed by software. The cache coherency software requires shared data is cleaned (by issuing cache maintenance operations) from the cache each time that data is to be accessed by a bus master in the alternate security domain from that which last had control of it, and hence had the opportunity to establish the shared data in the cache. For performance and power reasons, it would be advantageous to implement a hardware mechanism to maintain cache coherency of data which needs to be shared between secure and non-secure domains, where such systems contain at least one secure bus master with which data is to be shared, only being able to issue secure access requests.

SUMMARY

A first aspect provides a data processing apparatus having a secure and non-secure domain, a processing device operating in said secure domain having access to secure data that is not accessible to a processing device operating in said non-secure domain, said data processing apparatus comprising: at least one processing device; a cache operable to store data for processing by said at least one processing device, said cache comprising: a plurality of entries, each entry being, operable to store one or more data items, said data items including a status field, said status field being operable to store a security value indicative of whether said one or more data items are secure data, non-secure data or aliased data, wherein said secure data are only accessible in response to a secure data access request, said non-secure data are accessible in response to a non-secure data access request and said aliased data are accessible in response to either a secure or a non-secure data access request; and a bus fabric operable to transfer data between components of said data processing apparatus, said bus fabric operable to provide security data in response to a bus access request, said security data being indicative of whether said bus access request is to a storage location designated as secure, non-secure or aliased; wherein at least one of said security values stored in said status fields are derived from security data provided by said bus access request.

Accordingly, the data processing apparatus has a non-secure domain and a secure domain. A processing device in the data processing apparatus is operable such that when operating in a secure domain the program has access to secure data which is not accessible when the processing device is operating in a non-secure domain. Further, a cache is provided for storing data required by the processing device, the cache having a plurality of entries with each entry being operable to store one or more data items. Any given entry has an associated status field in which a security value is stored, indicative of a security domain from which that entry may be accessed. Furthermore, an aliased status is also advantageously provided for a data entry, indicating that it may be accessed either from a secure domain or a non-secure domain. This arrangement allows copies of data items which may need to be accessed by both secure and non-secure domains of the processing device to be cached for rapid access by the processing device. A secure bus master can thereby share memory with the non-secure world without having to issue non-secure access requests.

Nevertheless, given that the cache stores copies of data items, the ultimate arbiter of whether a particular data access request may in fact access a particular data entry comes from the definition of the security status of the original data item itself. Also, given the known concerns about the viability of ever larger operating systems to manage reliably the division between secure and non-secure data, this problem advantageously solved in hardware, by providing a bus fabric operable to provide security data in response to a bus access request, the security data being indicative of whether the bus access request is to a storage location designated as secure, non-secure or aliased. In this way, it is elements of the bus fabric, hardware components of the data processing apparatus, which provide the final arbitration as to which requests from the processing device may access which data items stored in the cache, thus keeping this crucial security decision separate from the operating system, which is known to be potentially vulnerable. It should be noted that in some embodiments elements of the bus fabric hardware might nevertheless be software programmable, yet this software would execute in the secure domain and therefore be trusted to do so. Thus, a system in which the cache can work with the bus fabric to determine secure, non-secure and aliased storage locations is provided without the need for software intervention to maintain coherency. Security information obtained from the bus fabric can be cached alongside the data. So that the system level cache can be used for both secure and non-secure accesses without the need to flush it between them.

In some embodiments said processing device comprises a bus master processing device, said bus master processing device comprising at least one of the following: a CPU and a direct memory access controller.

Although in many embodiments the system may comprise a bus master processing device such as a CPU, in some embodiments it may have a bus master processing device such as a DMAC which simply moves data around, but which in doing so maintains the coherency of the system.

In some embodiments, the data processing apparatus may comprise just one processor, which is operable at some times in a secure domain and at other times in a non-secure domain. In other embodiments the data processing apparatus may comprise two processors one operable in said secure domain and the other operable in said non-secure domain. Such an arrangement can allow for advantageously simple processors to be used in the data processing apparatus, which do not require the additional complexity attendant to being able to switch between security domains.

Whilst the cache could be used to store copies of data items retrieved from a range of sources, in preferred embodiments the data processing apparatus further comprises a memory, entries of which that are needed by the processing device may be copied to the cache.

The speed benefits of caching regularly used data items, rather than repeatedly reading them from and writing them to their original storage location, are clear. However, such copying of data items, and in particular the subsequent processing of copies of data items, brings with it attendant issues of coherency, This becomes particularly acute in a write-back cache where a complete line is allocated and written. In this case, the entry of the cache may have been established without reference to the original storage location. In order to note this potential security vulnerability, in preferred embodiments of the present invention said status field further comprises a verification flag associated with each entry, said verification flag being indicative of whether said security value of said status field has been confirmed from security data provided by said bus fabric in response to said bus access request to correspond to a security level of a corresponding entry in said memory unit.

Hence, if the situation arises where the security of a data access request received by the cache from the processing device does not correspond to the security status indicated by the status field of the corresponding cache entry, then reference can be made to the corresponding verification flag to confirm whether indeed a disallowed access request has been made or whether in fact the status field of the relevant entry needs updating. Thus, only in cases of non-verification need an access to the bus fabric be made.

In such a situation, where this kind of confirmation is required, a bus access request is made to query the hardware as to the true nature of the requested data item, that is, whether the original item is stored in a location defined as secure, non-secure or aliased, and hence whether or not the data access request by the processing device may proceed.

Whilst it will be appreciated that there are various ways in which a signal could be returned from the bus fabric to indicate this, in preferred embodiments the security data further comprises an indication of whether the data access request may proceed.

In embodiments of the present invention, said bus fabric comprises at least one of: an interconnect matrix; an address decoder; arbitration logic; peripheral interfaces; and a central protocol controller.

In embodiments, said security data provided by said bus fabric is generated by at least one of: said arbitration logic; said central protocol controller; and a peripheral device.

Whilst the foregoing elements thus provide an arrangement such that the security of a data access request may be compared to a status field of an entry in a data cache, and if necessary a bus access request may be generated to confirm the true nature of the original version of a data item in the cache, in preferred embodiments the cache is further operable to update the status field in response to the security data provided by the bus fabric. In this manner, subsequent data access requests to the same data entry may complete more quickly, by referencing up-to-date status information in the cache.

In some embodiments in response to a data access request to said cache where said security value does not match a security level of said data access request, said cache is operable to signal a cache miss if said security value is a verified security value, or to access a corresponding memory location via said bus fabric if said security value if not verified, and to update said security value with security data provided by said bus fabric and to mark said updated security value as verified.

The provision of a verification of the security value enables the processing device to know immediately, when a verified security value does not match a data access request, that a cache miss has occurred without the need to interrogate the bus fabric. It also allows it to know when the security value may not be correct and thus, interrogation of the bus fabric is required. This is particularly useful in cases of write back write allocate caches. In "Trustzone" an ARM® secure system, the ultimate arbiter of which memory mapped resources are secure and non-secure is the bus fabric. The security status of each access request received by the bus fabric is analyzed, and a decision made as to whether or not that access should be allowed to proceed. Non-secure access requests to secure memory mapped resources are never allowed to complete. Secure access requests to non-secure memory mapped resources may or may not be allowed to complete. Secure access requests to secure, and non-secure to non-secure memory mapped resources are always allowed to complete.

In a write back, write allocate system, if a cachable write access request misses in a cache, the data supplied with the write access request is established in the cache according to the following procedure:

a victim cache line is chosen
 The victim cache line is cleaned, i.e. clean victim cache lines are invalidated, data in dirty victim cache lines is written back to memory, prior to the cache line being invalidated
 the complete cache line of data to be written to is loaded from main memory from the start address corresponding to the address provided with the write request
 the write completes by over writing the portions of the cache line indicated by the address and size information provided with the write request.

Following such a procedure, the bus fabric is able to analyze the security status provided by the write request, and so decide whether the access request should be allowed to complete, when reading the cache line from memory before the cache write operation is allow to proceed.

In the case where the cache can determine from the write request's address and size information that the whole of a cache line may be overwritten, a known optimisation is to omit the step of loading the victim line from main memory. If such an optimisation is implemented, then the bus fabric is not immediately given the opportunity to check whether or not an access request should be allowed to complete based on its security status. This is generally not considered a security problem, as the cache line will eventually be evicted from the cache, and so become visible to the bus fabric, as a result of a cache cleaning operation instigated by either a cache maintenance operation (perhaps issued by cache coherency software), or that cache line itself becoming a victim in some subsequent a cache miss condition.

For performance reasons, there is benefit in a cache coherence mechanism which is able to provide coherency for cached data shared by secure and non-secure bus masters, where at least one of the bus masters is only able to issue secure access requests. The provision of the verified status enables such coherency and thus allows such a system to take advantage of this known write back write allocate optimization, by not requiring the bus fabric to confirm the security status of a cache line unless an attempt is made to access the data from a different security domain from that which established the data in the cache.

A second aspect provides a method of controlling access to a cache of a data processing apparatus, the data processing apparatus having a secure and non-secure domain, a processing device operating in said secure domain having access to secure data that is not accessible to a processing device operating in said non-secure domain, said data processing apparatus comprising at least one processing device; a cache operable to store data for processing by said at least one processing device, said cache comprising a plurality of entries, each entry being operable to store one or more data items; and a bus fabric operable to transfer data between components of said data processing apparatus, the method comprising the steps of (i) storing one or more data items in each of a plurality of entries in said cache; (ii) associating a status field with each of said entries; (iii) storing in each of said status fields a security value indicative of whether said one or more data items stored in said entries are secure data items, non-secure data items, or aliased data items, said aliased data items being accessible by either a secure access request or a non-secure access request, at least some of said security values being derived from security data provided by said bus fabric in response to a bus access request; (iv) in response to a data access request from said at least one processing device to one of said data items, allowing access to said requested data item in said cache if said security value corresponding to said data item either matches a security level of said data access request or is aliased and not allowing said access if it does not match and is not aliased.

A third aspect provides a computer program product which is operable when run on a data processor to control the data processor to perform the steps of the method according to the second aspect of the present invention.

The above, and other objects, features and advantages will be apparent from the following detailed description of illustrative embodiments which is to be read in connection with the accompanying drawings.

DETAILED DESCRIPTION

Figure 1:
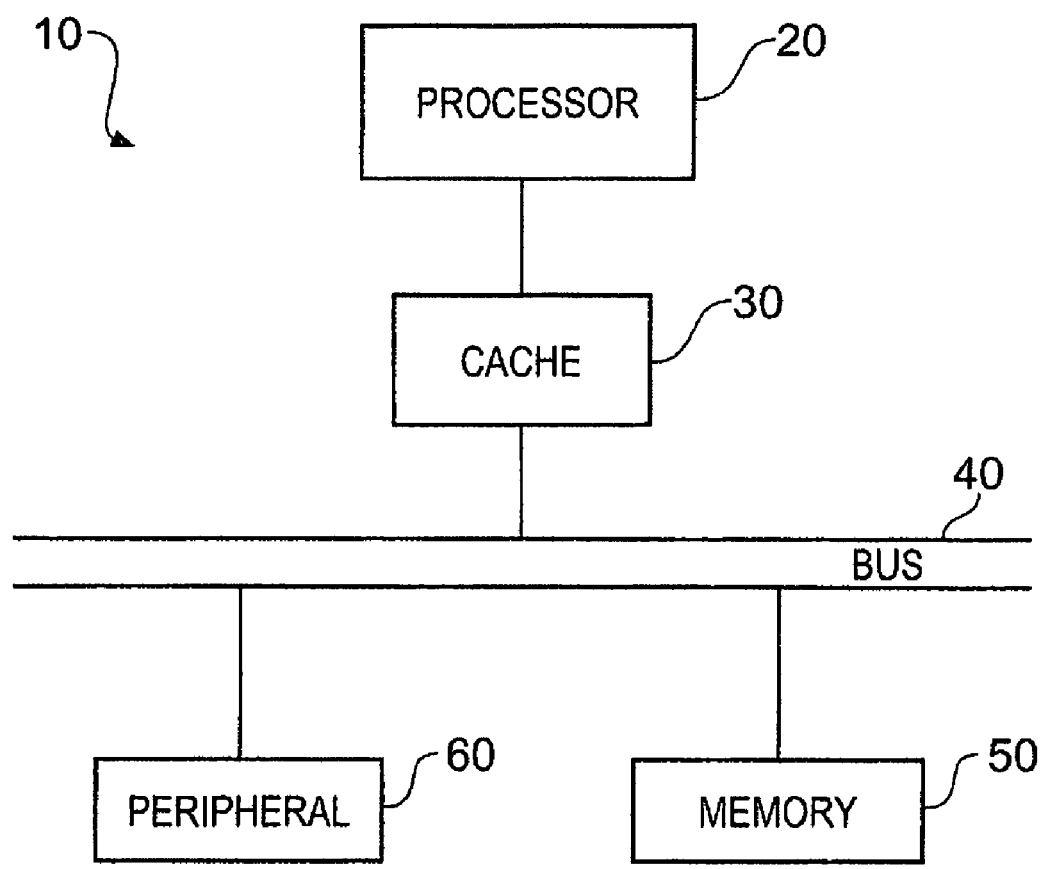
FIG. 1 is a block diagram illustrating a data processing apparatus including a cache and an external memory device.
Figure 2:
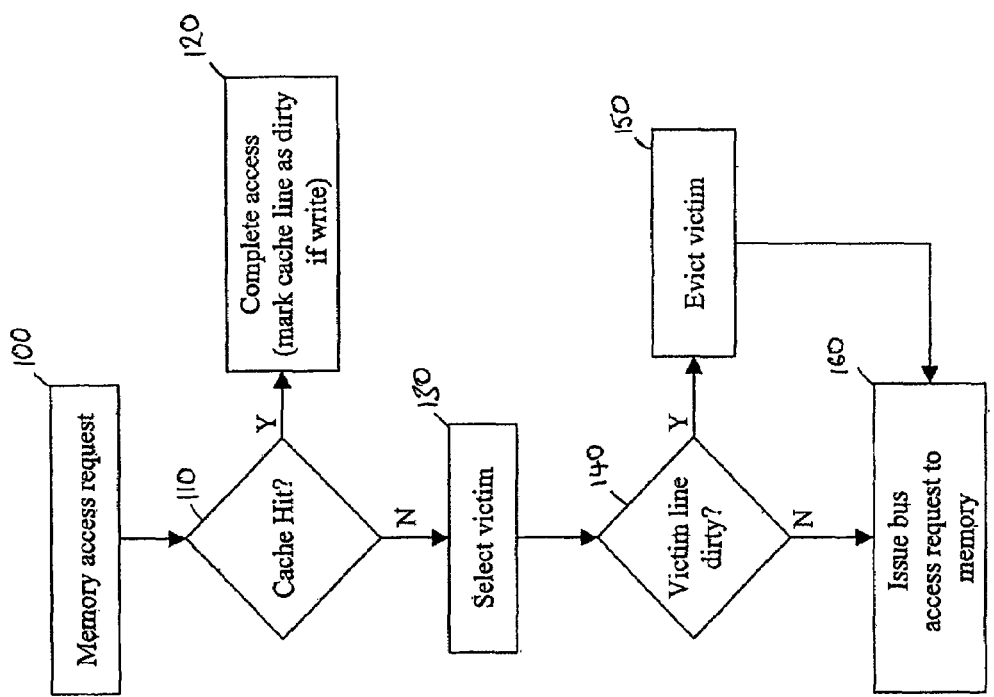
FIG. 2 is a flow diagram showing the steps followed when a memory access request reaches the cache in a known data processing apparatus.
Figures 3, 4:
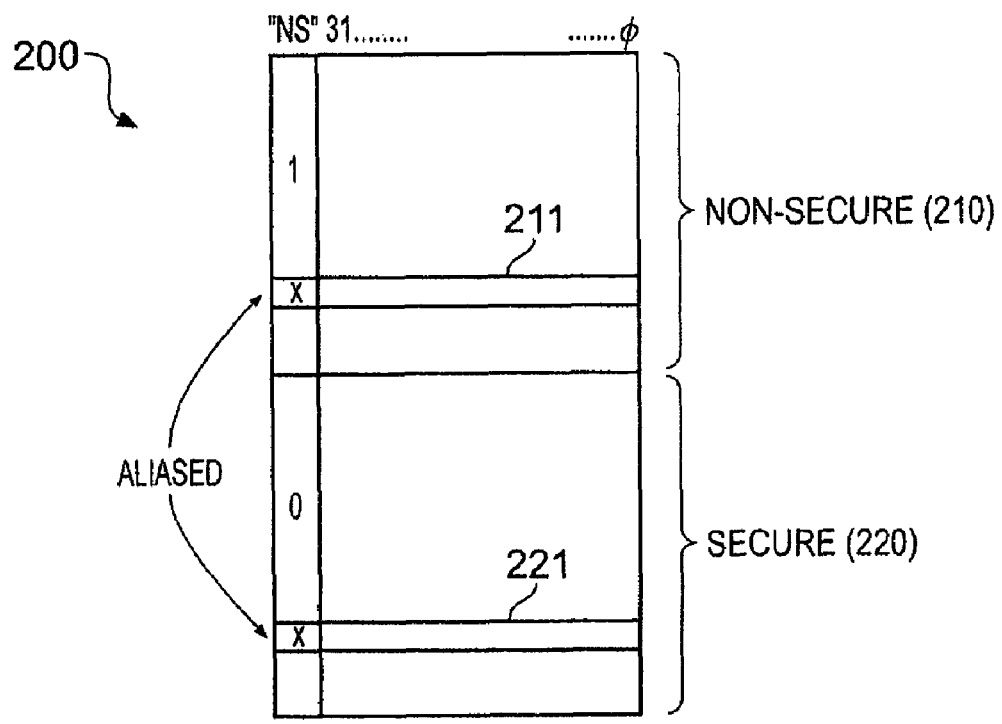
FIG. 3 is a schematic illustration of a block of memory divided into a non-secure portion and a secure portion.
FIG. 4 is a table illustrating the conditions for a "cache hit" in the cache.

The present non-limiting and example embodiments are relevant to one or more processors that may run some applications which are secure and other applications which are non-secure. It is also relevant to apparatus that have processing devices such as DMACs which move secure and non-secure data around the system. In the following text we will consider a data processing apparatus having a processor running applications. A data processing apparatus having such a processor will typically designate some areas of its memory as secure and other areas as non-secure. FIG. 3 illustrates such a division of memory address space. The upper half 210 of this address space 200 is designated as non-secure and the lower half 220 as secure. The most significant bit (MSB) of the addresses in this address space is known as the "NS" bit and determines whether an address is in the upper non-secure half or the lower secure half of the address space. Thus, non secure processes running on the processor have access to the non-secure half 210 of this memory address space 200 and secure processes running on the processor have access to the secure half 220. However, in addition there may also be the need for both secure and non-secure processes to be able to access the same data items stored in the memory. For this reason pairs of lines (e.g. 211 and 221), one in each half of the memory space, may be "aliased" indicating that they are accessible to both non-secure and secure processes. This arrangement is easily implemented by masking the MSB such that the two lines share the same address. The administration of access to secure, non secure or aliased portions of the memory address space is performed by the bus 40. The combination of the bus 40 itself and the attendant logic for performing this administration is known as the "bus fabric". Since the bus fabric is part of the hardware of the data processing apparatus, this means that this crucial security administration is not left to the operating system, which could be vulnerable to attack. In some embodiments elements of the bus fabric hardware might nevertheless be software programmable, yet this software would execute in the secure domain and therefore be trusted to do so.

An external memory device such as the one illustrated in FIG. 3 presents additional complications for a data cache. This is because the security features of the external memory device must be supported by the cache, otherwise the security of the data items copied to the cache from the external memory could be compromised. For this reason entries in the cache, as well as having the data item itself and its TAG (i.e. its address indicator), also have an additional status bit indicating the security status of this cache entry. Importantly, the maintenance of this security status bit is carried out in embodiments by the interaction between the cache and the bus fabric thus keeping this security issue under hardware, rather than software, control. More detail of the interaction between the cache and the bus fabric will be given later on.

FIG. 4 is a table showing the conditions for entries in the cache to produce a cache hit depending on the cache entry security status, the security of the memory access request and whether the data item addresses match. The left hand column shows the four possible configurations of the security status of a particular cache entry; aliased, non-secure, secure or unknown. A cache hit will only be generated if the security of a memory access request matches the security status of the cache entry or if the security status of the cache entry is aliased. Clearly there also needs to be a match between the address of the requested data item and an address stored in the cache. If the security of a memory access request and the security status of a cache entry (with a matching address) do not correspond then there is a cache miss. If there is no match between the requested data item address and an address stored in the cache then there is always a cache miss. If there is a cache hit, then the memory access request may proceed directly in the cache without further reference to the bus fabric or external memory.

Figure 5:
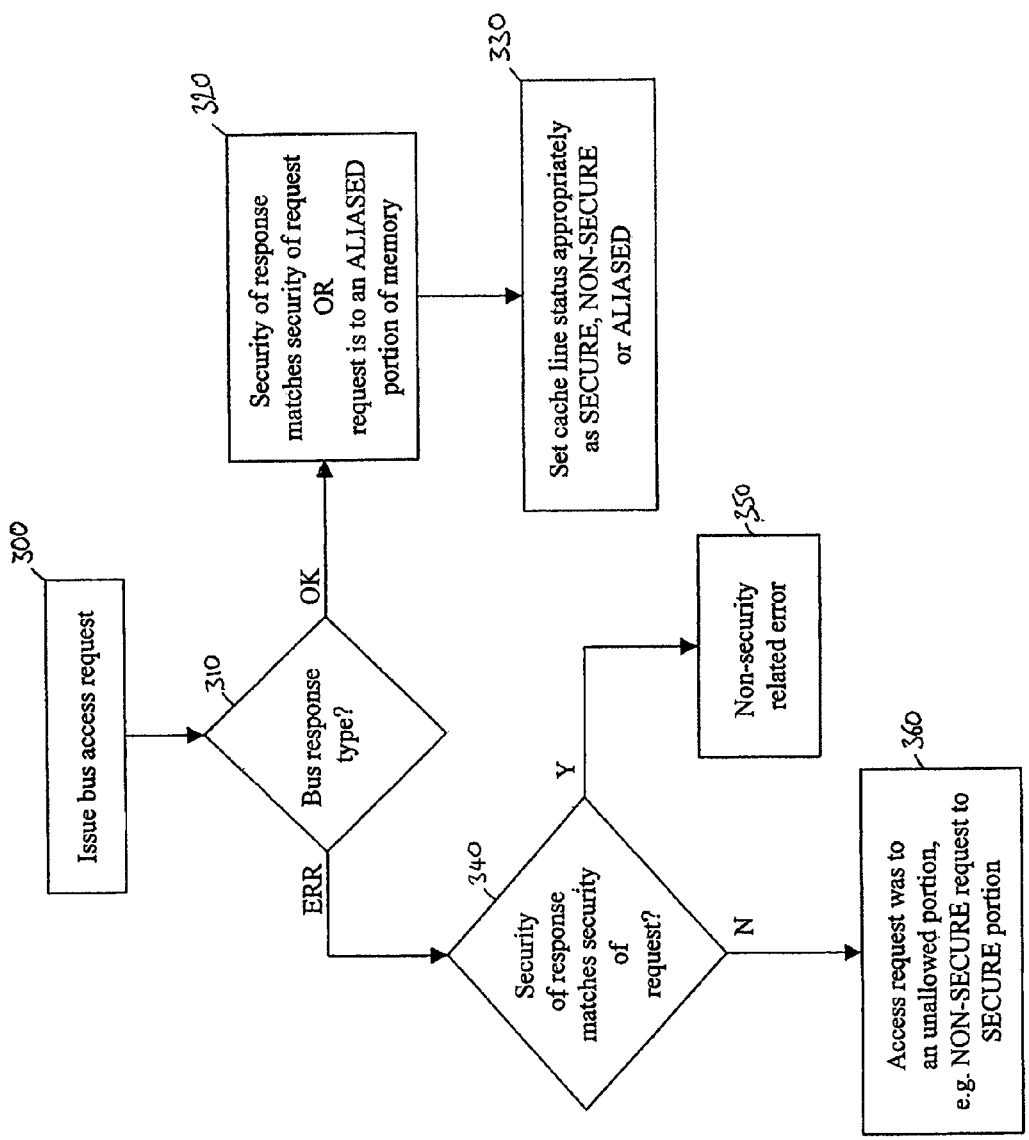
FIG. 5 is a flow diagram showing the steps followed after issuing a bus access request to check the security status of a cache data entry.

If there is a cache miss then the cache interrogates the bus fabric by issuing a bus access request to determine whether the memory access request is permissible or not. FIG. 5 illustrates the steps subsequent to a bus access request being issued. In response the bus fabric is able to make one of five security related responses; secure OK, secure ERR, aliased OK, non-secure OK or non-secure ERR. The bus response to a bus access request issued at step 300 is evaluated at step 310 to be "OK" or "ERR". If it is OK then this indicates (step 320) that either the security statuses match (secure memory access request to secure data or non-secure memory access to non-secure data) or the requested data item is stored in an aliased portion of memory. Then at step 330 a cache line 10 allocated to this data item may be updated as secure, non-secure or aliased, as appropriate. Alternatively at step 310 it may be established that the bus has provided a "ERR" response. In this case the flow proceeds to step 340 to analyse the reason for this error response. If the security of the bus response matches the security of the memory access request then the error is due to something other than a security issue (step 350). If however the security of the bus response does not match the security of the memory access request, then this indicates that an access request was made to an unallowed portion, i.e. a non-secure request to a secure portion of memory or a secure request to a non-secure portion of memory.

Figure 6:
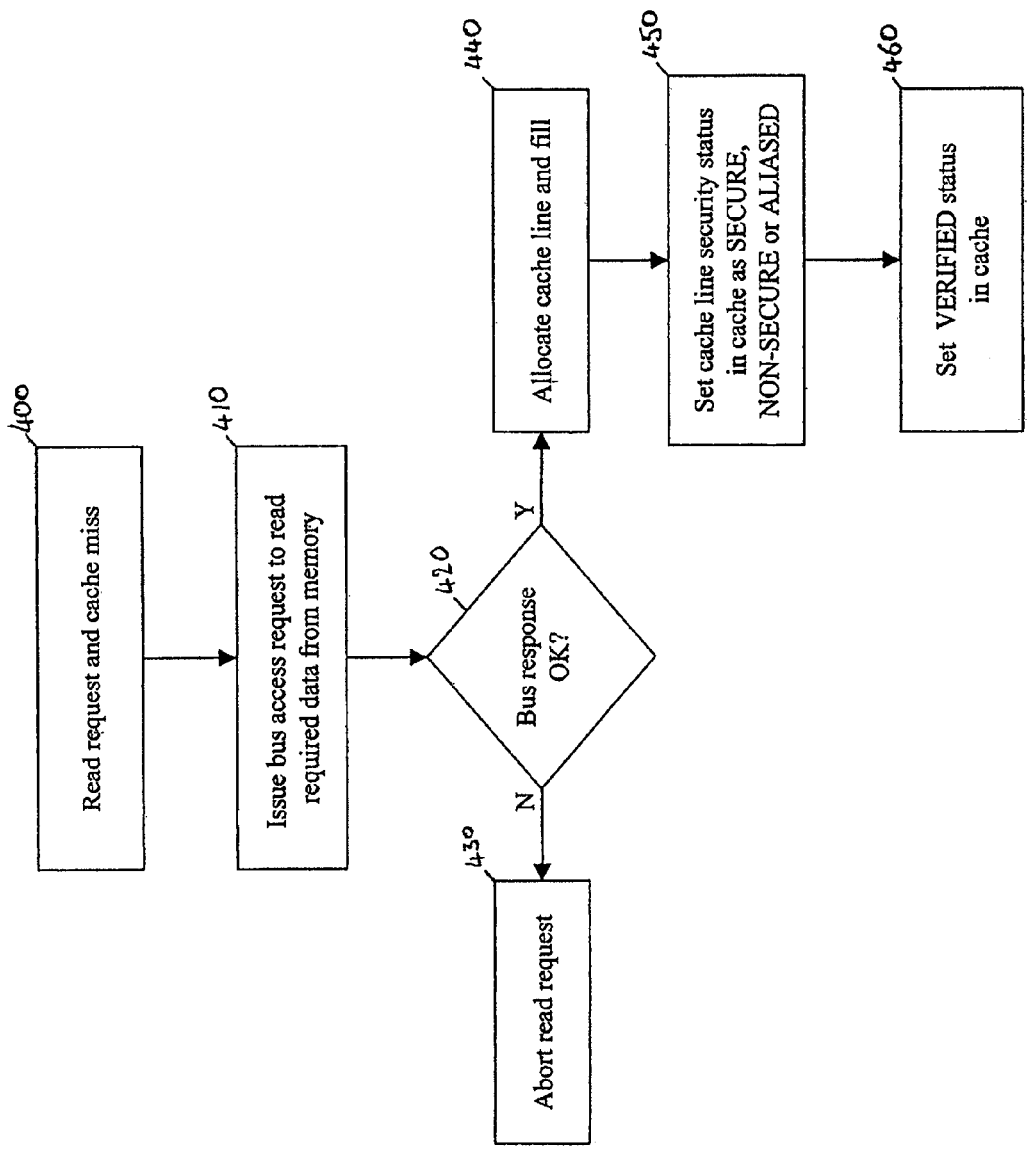
FIG. 6 is a flow diagram showing the steps followed after a read request misses in the cache.

The interrogation of the bus fabric to establish the security status of a data item in the external memory need only be performed once by the provision of an additional verification bit in the cache. By setting this additional bit to indicate "verified" a cache entry is marked as having had its security status confirmed by a bus access request. It may be that a cache entry is "verified" at its inception. This is the case when a cache line is established by a read, the steps of which are shown in FIG. 6. When a memory access request is a read and misses in the cache (step 400), then a bus access request is issued to read the required data from the external memory (step 410). The bus response is then examined at step 420 and if the response is not OK then the read request is aborted (step 430). If the bus response is OK, then a cache line is allocated and filled with the data read from the external memory (step 440). This cache line then has its security status set as secure, non-secure or aliased (step 450) as appropriate. Finally the cache line is marked as "verified" (step 460), indicating that this cache lines security status has been confirmed by the bus fabric.

Figure 7:
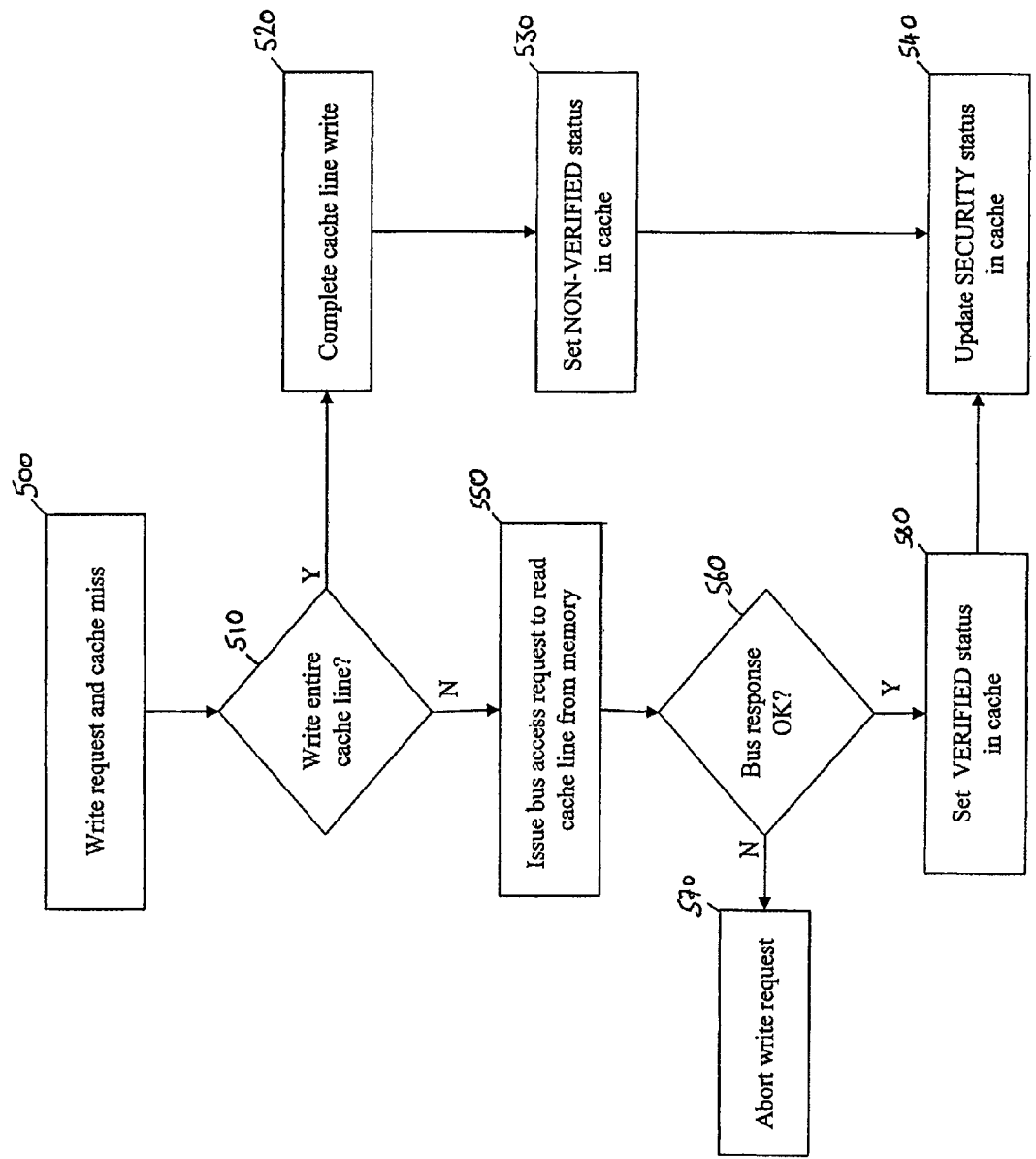
FIG. 7 is a flow diagram showing the steps followed after a write request misses in the cache.

Alternatively in some embodiments a cache line in a write back cache may be established due to a write request, the steps of which are illustrated in FIG. 7. Such functionality is an optimisation wherein the speed benefit of not accessing the memory is considered to outweigh the disadvantages (e.g. the lack of verification). When a memory access request is a write request and misses in the cache (step 500), then it is first established whether an entire cache line is to be written (step 510). If it is then the flow proceeds to step 520 and the cache line is allocated and written without reference to the bus fabric or external memory. However, since in this case the security status of this line has not been confirmed by the bus fabric, then at step 530 the cache line is marked as "non-verified" in the cache. Finally, at step 540 the cache line is marked with the security status of the write request from the processor. Hence, cache lines written via this route will be marked as either secure non-verified or non-secure non-verified. If however at step 510 it is established that an entire cache line is not being written then a bus access request is issued (step 550) to read the corresponding cache line from the external memory. If the security response of the bus (step 560) is not OK, then the write request is aborted (step 570). If the bus response at step 560 is OK then the cache line is marked as "verified" (step 580) and finally also marked with the appropriate security status (step 540). Hence, a cache line written by this route will be marked as secure verified, non-secure verified or aliased. Note that it is implicit in the aliased status that the cache entry is also verified since aliased data may be accessed by either secure or non-secure access requests and therefore the concept of a "wrong" security status does not exist.

Figure 8:
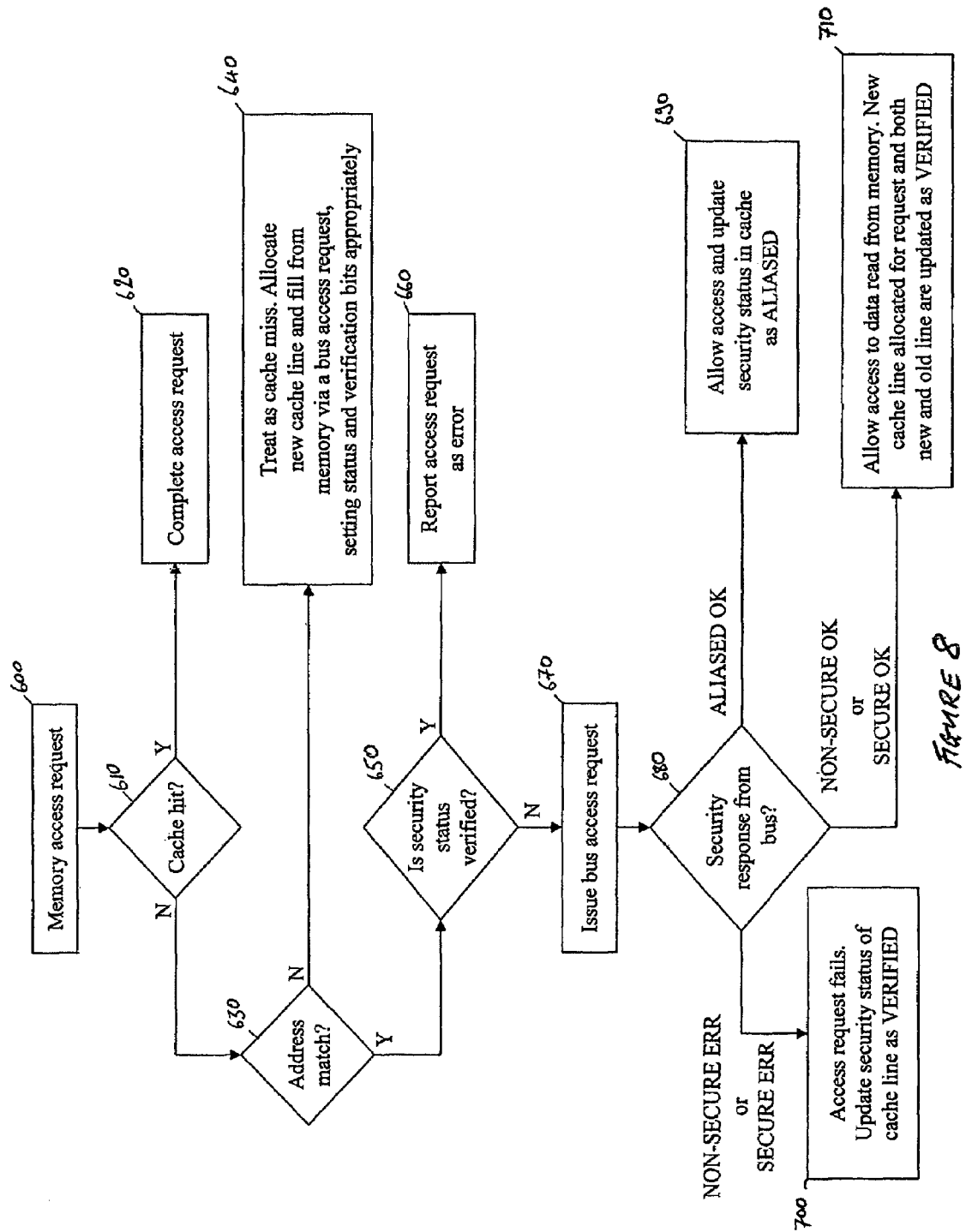
FIG. 8 is a flow diagram showing the steps followed when a memory access request reaches the cache.

FIG. 8 illustrates the steps followed when a memory access request from the processor reaches a cache that has both security and verification status bits. An issued memory access request (step 600) will either hit or miss in the cache (step 610) according to the conditions defined in FIG. 4. If there is a cache hit then the access request is allowed to complete directly (step 620). If there is a cache miss and furthermore there is no match between the address of the requested data item and the addresses (TAGs) stored in the cache (step 630) then the memory access request is treated as a cache miss (step 640) and a new cache line is allocated and filled from the external memory. If however there is an address match (step 630) this means that the security of the memory access request and the security status of the cache entry with the matching address do not correspond. In this event the verification status of this cache entry is examined (step 650). If the cache entry is "verified" then the access request is reported as an error (step 660). If however the security status is not verified then a bus access request is issued (step 670) to cause the bus fabric to check the security status of the cache line. The security response from the bus (step 680) can be one of three types. If the response is "aliased OK" then at step 690 the access is allowed and the security status in the cache is updated as aliased. If the bus response is either "secure ERR" or "non-secure ERR" then the access request fails (step 700). In addition the security status of the corresponding cache line is updated as "verified". Finally if the security response from the bus is either "non-secure OK" or "secure OK" then this implies that the cache entry corresponds to the opposite security equivalent in the main memory (i.e. the addresses match in all but the NS bit—see FIG. 3). Since the bus fabric has given a "OK" response then at step 710 access is allowed to the data read from the external memory (corresponding to the security of the access request). A new cache line is allocated for this request (as in steps 450 and 460 of FIG. 6) and marked with the appropriate security status and as "verified". Additionally the cache entry which caused the address match at step 630 can be updated as verified, since its correspondence in the external memory has now been confirmed.

Figure 9:
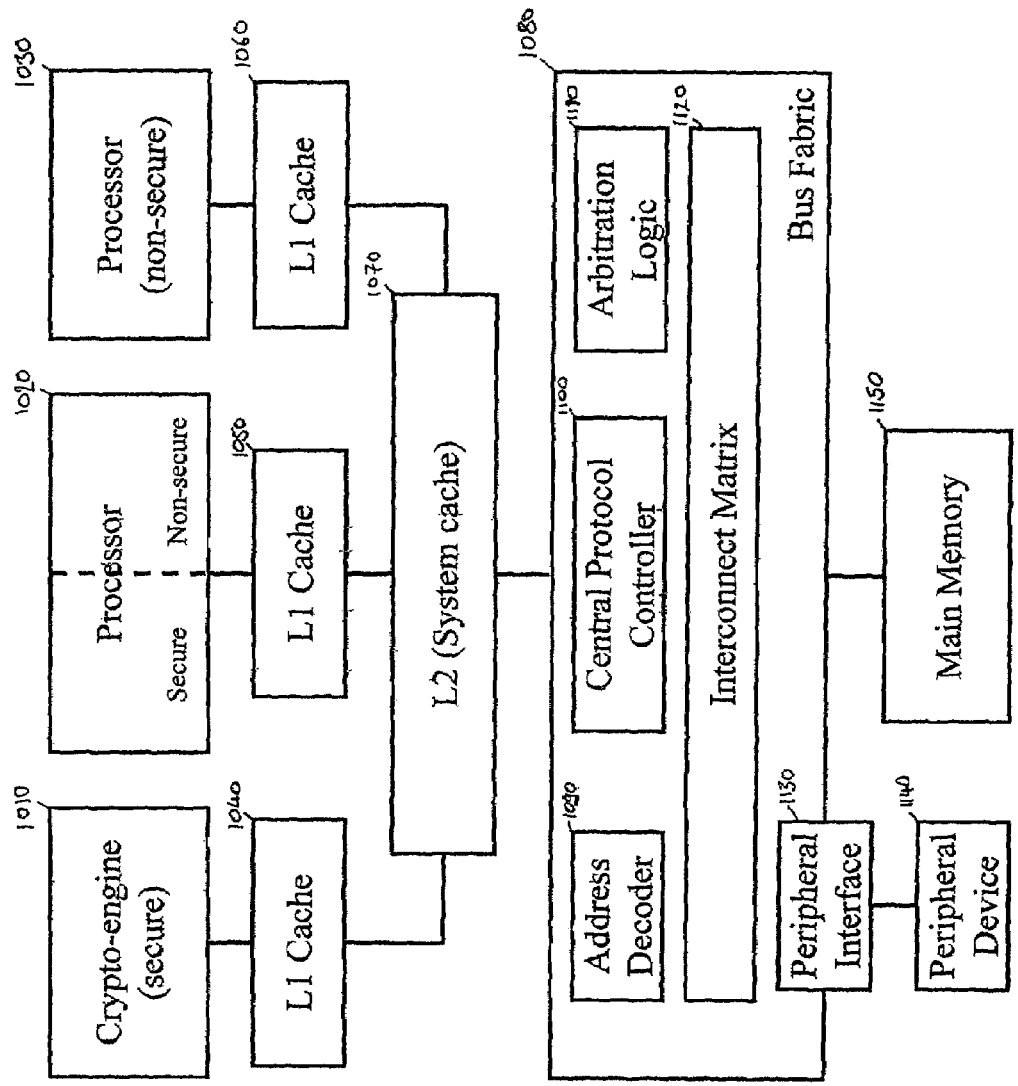
FIG. 9 is a block diagram illustrating a data processing apparatus according to is an embodiment of the present invention.

FIG. 9 illustrates an exemplary data processing apparatus according to an embodiment. The data processing apparatus has three bus master devices: crypto-engine 1010, processor 1020 and processor 1030. Each of these bus master devices is a variety of processor, although crypto-engine 1010 is a dedicated encryption/decryption device, whereas processors 1020 and 1030 are general purpose processors. Processor 1020 is also a multi-domain device, in that it has the ability to operate in both the secure domain and the non-secure domain. By contrast, crypto-engine 1010 is fixed in the secure domain and processor 1030 is fixed in the non secure domain.

Each bus master device has its own dedicated level one (L1) cache. Furthermore all three are connected to a level two (L2) system cache. Hence, a data access request issued by one of the bus master devices might either hit in its own L1 cache, in the shared L2 cache 1070 or miss in both and be passed to the bus fabric 1080. Whether a particular memory location is L1 cacheable and/or L2 cacheable may be system designer specified. For data which is only cacheable in L1, a corresponding data access request does not interact with the shared L2 cache 1070. For data which is only cacheable in the shared L2 cache, a corresponding data access request does not interact with the L1 cache associated with the processor issuing the data access request.

In the situation where data is cacheable in both L1 and L2 caches, more complex interaction occurs. If L1 misses, but L2 hits, then the L2 cache will pass the associated security data back to the L1 cache, along with the requested data The same restrictions which the bus fabric would apply to the verification of a data access request are applied by the L2 cache in this situation, i.e. only secure data accesses may access secure data, only non-secure data access requests may access non-secure data and either kind of data access request may access aliased data.

The bus fabric 1080 comprises an address decoder 1090, a central protocol controller 1100, arbitration logic 1110 and an interconnect matrix 1120. Address decoder 1090 serves to translate the address of a received data access request into the corresponding physical location, central protocol controller 1100 administers the protocols of the bus fabric and arbitration logic 1110 governs the arbitration between the various signals being passed by the bus fabric. Interconnect matrix 1120 provides the interconnections necessary between the components connected by the bus fabric. Peripheral interface 1130 connects the bus fabric 1080 to a corresponding peripheral device 1140 and main memory 1150 is also connected to the bus fabric 1080. Whilst the bus fabric may be the arbiter of whether a data access request should be allowed to proceed, in some circumstances when a data access request is seeking to access a peripheral device 1140, the peripheral device 1140 may provide the security response itself, with the bus fabric merely transporting this security response back to the relevant cache.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the claims.

I claim:

1. A data processing apparatus having a secure and non-secure domain, a processing device operating in said secure domain having access to secure data that is not accessible to a processing device operating in said non-secure domain, said data processing apparatus comprising:
    at least one processing device;
    a cache arranged to store data for processing by said at least one processing device, said cache comprising:
    a plurality of entries, each entry being arranged to store one or more data items, said data items including a status field, said status field being arranged to store a security value indicative of whether said one or more data items are secure data, non-secure data or aliased data, wherein said secure data are only accessible in response to a secure data access request, said non-secure data are accessible in response to a non-secure data access request and said aliased data are accessible in response to either a secure or a non-secure data access request; and
    a bus fabric arranged to transfer data between components of said data processing apparatus, said bus fabric arranged to provide security data in response to a bus access request, said security data being indicative of whether said bus access request is to a storage location designated as secure, non-secure or aliased;
    wherein at least one of said security values stored in said status fields are derived from security data provided by said bus access request,
    wherein said status field further comprises a verification flag associated with each entry, said verification flag being indicative of whether said security value of said status field has been confirmed from security data provided by said bus fabric in response to said bus access request to correspond to a security level of a corresponding entry in said memory unit, and
    wherein in response to a data access request to said cache where said security value does not match a security level of said data access request, said cache is arranged to signal a cache miss if said security value is a verified security value, or to access a corresponding memory location via said bus fabric if said security value if not verified, and to update said security value with security data provided by said bus fabric and to mark said updated security value as verified.

2. A data processing apparatus according to claim 1, wherein said processing device comprises a bus master processing device, said bus master processing device comprising at least one of the following: a CPU and a direct memory access controller.

3. A data processing apparatus as claimed in claim 1, further comprising two processors one arranged in said secure domain and the other arranged in said non-secure domain.

4. A data processing apparatus as claimed in claim 1, wherein said data processing apparatus further comprises a memory.

5. A data processing apparatus as claimed in claim 1, wherein said security data provided by said bus fabric further comprises an indication of whether said data access request may proceed.

6. A data processing apparatus as claimed in claim 1, wherein said bus fabric comprises at least one of:
    (i) an interconnect matrix;
    (ii) an address decoder;
    (iii) arbitration logic;
    (iv) peripheral interfaces; and
    (v) a central protocol controller.

7. A data processing apparatus as claimed in claim 1, wherein said security data provided by said bus fabric is generated by at least one of:
    (i) said arbitration logic;
    (ii) said central protocol controller;
    (iii) a peripheral device;
    (iv) an address decoder; and
    (v) a peripheral interface.

8. A data processing apparatus as claimed in claim 1, wherein said cache is further arranged to update said status field in response to said security data provided by said bus fabric.

9. A method of controlling access to a cache of a data processing apparatus, the data processing apparatus having a secure and non-secure domain, a processing device operating in said secure domain having access to secure data that is not accessible to a processing device operating in said non-secure domain, said data processing apparatus comprising at least one processing device; a cache arranged to store data for processing by said at least one processing device, said cache comprising a plurality of entries, each entry being arranged to store one or more data items; and a bus fabric arranged to transfer data between components of said data processing apparatus, the method comprising the steps of
    (i) storing one or more data items in each of a plurality of entries in said cache;

(ii) associating a status field with each of said entries;

(iii) storing in each of said status fields a security value indicative of whether said one or more data items stored in said entries are secure data items, non-secure data items, or aliased data items, said aliased data items being accessible by either a secure access request or a non-secure access request, at least some of said security values being derived from security data provided by said bus fabric in response to a bus access request;

(iv) in response to a data access request from said at least one processing device to one of said data items, allowing access to said requested data item in said cache if said security value corresponding to said data item either matches a security level of said data access request or is aliased and not allowing said access if it does not match and is not aliased, (v) when said access according to step (iv) is not allowed, determining if said stored security value was derived from security data provided by a previous bus access request and if it was:

(va) indicating a cache miss; and if it was not (vb) issuing a bus access request corresponding to said data access request to said bus fabric, said bus fabric providing in response to said bus access request security data indicative of whether said data access request is to a storage location designated as secure, non-secure or aliased and updating said security value of said entry.

10. A method as claimed in claim 9, wherein said data processing apparatus further comprises a memory.

11. A method as claimed in claim 10, wherein step (iii) further comprises storing in said status field a verification flag indicative of whether said security value of said status field has been confirmed to correspond to a security level of a corresponding entry in said memory unit.

12. A method according to claim to 9, wherein step (va) is performed if said security value is verified and step (vb) is performed if said security value is not verified.

13. A method as claimed in claim 9, wherein step (vb) further comprises providing in response to said bus access request security data indicative of whether said data access request may proceed.

* * * * *